A. G. L. NEIGHBOUR.
CHANGE SPEED GEAR FOR MOTORS.
APPLICATION FILED MAR. 1, 1916.

1,227,298.

Patented May 22, 1917.
2 SHEETS—SHEET 1.

Inventor
Arthur G. L. Neighbour

Witnesses
Earl H. Trimyer
James F. FitzGibbon

By James L. Norris
Attorney

A. G. L. NEIGHBOUR.
CHANGE SPEED GEAR FOR MOTORS.
APPLICATION FILED MAR. 1, 1916.

1,227,298.

Patented May 22, 1917.
2 SHEETS—SHEET 2.

Witnesses
Earl H. Trimyer
James F. Fitz Gibbon

Inventor
Arthur G. L. Neighbour
By
James L. Norris
Attorney

UNITED STATES PATENT OFFICE.

ARTHUR GEORGE LLOYD NEIGHBOUR, OF BEAUMARIS, VICTORIA, AUSTRALIA.

CHANGE-SPEED GEAR FOR MOTORS.

1,227,298.  Specification of Letters Patent.  Patented May 22, 1917.

Application filed March 1, 1916. Serial No. 81,527.

*To all whom it may concern:*

Be it known that I, ARTHUR GEORGE LLOYD NEIGHBOUR, a subject of the King of Great Britain, residing at Cromer Road, Beaumaris, in the State of Victoria, Commonwealth of Australia, have invented certain new and useful Improvements in Change-Speed Gear for Motors, of which the following is a specification.

This invention relates to internal combustion engines as used for driving motor cycles and cycle cars and other light motor vehicles, and refers more particularly to that class of engine which has a change speed gear combined with it in a single power unit. The machine is thereby greatly simplified and its cost and weight of working parts considerably reduced, and at the same time it is rendered much more compact and efficient than when a separate gear box situated behind the engine is employed.

The usual chain from the engine to the said gear-box and short driving belt thence to the road wheel are replaced by a single belt which on account of its greater length has longer life and better gripping power.

In the case of chain drive however I find it preferable to drive to a single counter shaft behind the engine, thence to the back wheel instead of using a single chain direct, as the latter owing to its length is liable to jump off if loose. If I employ positive clutches with the chain drive I prefer to provide the said countershaft with a friction clutch to avoid shock when changing gear.

If in addition to the combined two-speed gear and engine hereinafter described a separate two-speed gear-box is provided behind the engine four changes of speed may be obtained.

Other combinations and further advantages will be indicated and pointed out in the following description:—

I shall now refer to the accompanying drawings:—

Figure 1 is a side elevation of a motor cycle engine embodying one method of carrying out the present invention. Fig. 2 is a part vertical section thereof. Fig. 3 is a transverse section on a plane passing through the axes of the crank shaft, the cam shaft, and a crank case bolt which also forms the fulcrum of the tappet levers.

I shall first describe the invention as combined with a single cylinder internal combustion engine and so arranged as to provide two speeds with an intermediate position in which the engine is disconnected from the road wheel and runs free.

I do not confine myself to a single cylinder engine, as the present invention may be combined with a V type twin cylinder engine, an opposed cylinder engine, or a multi-cylinder engine having several cylinders in line.

Referring more particularly to Figs. 1, 2, 3, and 4, of the attached drawings:—

The crankshaft 1, projects through the crank case 2, and on each side thereof, and carries at one end a flywheel outside the said casing.

Adjacent to the said flywheel, but within the said casing, are arranged the spur wheels 3 and 4, which drive the camshaft 5, in the usual ratio of 2 to 1, that is, the said camshaft 5 revolves at one half the speed of the crankshaft 1.

Figure 3:
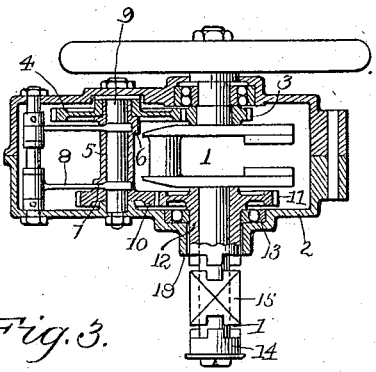

The arrangement of the above gears 3 and 4 and camshaft 5, is best seen in Fig. 3.

The camshaft 5, has formed upon it the cams 6 and 7, which operate the valves through the medium of the tappet levers 8.

The said cam shaft 5, is preferably made hollow, and revolves upon a fixed spindle 9, which, in addition to forming a bearing of ample proportions also helps to stay and hold together the two halves of the crankcase 2.

The said cam shaft 5, also carries a spur wheel 10. Upon the crankshaft 1 is mounted the spur wheel 11 to which is rigidly attached the sleeve 12, said sleeve 12 and spur wheel 11, being free to revolve concentrically upon the crankshaft 1, as shown in Figs. 2 and 3.

Figure 2:
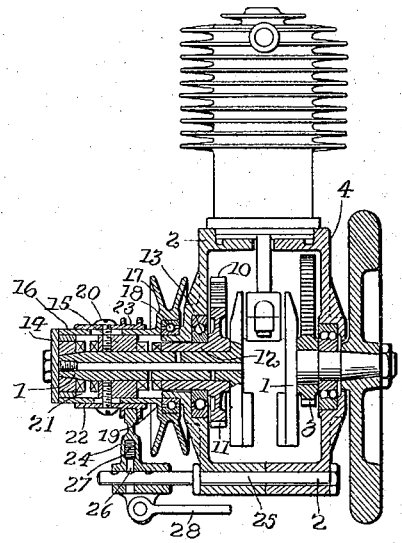

The said sleeve 12, and the crankshaft 12 lying therein are supported by the bearing 13, carried in the crank case 2, said sleeve projecting outside the said crankcase as shown in Figs. 2 and 3. Spur wheel 11 meshes with the spur-wheel 10, secured to the camshaft 5, as above described, and if the said wheels 10 and 11 have equal numbers of teeth the said spur wheel 11 with the attached sleeve 12 will revolve at the same speed as the camshaft, that is at half the speed of the crankshaft.

Further the number of teeth on the said gear wheels 10 and 11 may be varied so as to obtain a different speed relative to the crankshaft as may be desired.

Thus it will be seen that the said spur wheel 11, and sleeve 12 revolve concentrically around the said crankshaft 1 at a predetermined lower speed but in the same direction.

The above description with the aid of the attached drawings serves to illustrate the essential features of my said invention viz:— the combination of the crankshaft 1, the camshaft 5, and the sleeve 12, said sleeve being driven through the camshaft by means of gears 3, 4, 10, and 11 and being adapted to rotate in the same direction as the said crankshaft but at a lower speed.

At the outer end of the said sleeve 12 jaws of a clutch of the well known positive or "dog" type are formed as shown in Figs. 2 and 3. This clutch I shall hereinafter refer to as the sleeve clutch or low gear clutch.

The crankshaft 1 aforesaid is extended outwardly beyond the said sleeve 12 and has secured to it a piece 14, which similarly has jaws of a clutch formed at its inner end hereinafter termed the shaft clutch or high gear clutch.

A double clutch 15, slidably mounted, but free to revolve upon the aforesaid crankshaft is placed between the said shaft and sleeve clutches, as shown in Figs. 2 and 3, hereinafter termed the sliding clutch. The said sliding clutch 15 has jaws formed at each end thereof similar to those of the aforesaid sleeve and shaft clutches, and may be slid along the crankshaft 1 and engaged with either of the said clutches. The outside of the said clutch 15 is squared, and adapted to fit the square hole formed in the boss 16, of the belt pulley 17, Fig. 4.

Thus the said sliding clutch 15 may be slid longitudinally within the pulley boss, but cannot rotate relatively thereto. That is to say the said clutch 15, boss 16, and pulley 17, always revolve together. If the clutch 15 be engaged with the shaft clutch 14 the pulley will be driven at the same speed as the engine crankshaft; that is, the drive is direct.

If the clutch 15 engages with the sleeve clutch the pulley will be driven at the speed of the sleeve 12, the engine then being in the low gear. Moreover, if the clutch 15 be held midway between the said shaft and sleeve clutches as shown in Figs. 2 and 3, the pulley will be disconnected from the engine which will then run free.

I am aware that motor cycle engines have been constructed in which a countershaft is extended through the crank case and carries the driving wheel, the said countershaft being driven through either of two gears from the crankshaft so as to provide a high or low gear.

The disadvantage of such arrangements is that the drive is always through gearing resulting in increased wear and frictional loss with corresponding lowering of efficiency.

In the present invention the high gear is a direct drive, the pulley being clutched directly to the engine-crankshaft. As the direct drive is in use by far the greater part of the time (the low gear only being required on steep hills, or when moving through traffic) it is obvious that the efficiency must be greater than when the high speed drive takes place through gearing.

I am also aware that pulleys containing epicyclic gearing have been employed to provide two speeds with direct drive on the top gear but these have the disadvantage of being heavy and the gears being outside the crankcase cannot be so efficiently lubricated as when situated therein.

I shall now continue the foregoing description:—Referring to Fig. 2 of the attached drawing, the pulley boss 16 at its outer end runs upon the outside of the shaft clutch aforesaid. Within the said pulley, and lying in the same plane therewith ball bearing 18 is mounted upon a boss 19 formed on the crankcase 2 as shown in Fig. 2.

The said bearing 18 being in line with the belt, the pull of the latter is transferred directly to the boss 19, thus eliminating sidewise pull on the bearing 13.

I shall now describe the means by which I prefer the sliding clutch 15 to be moved longitudinally within the boss 16. Screws 20 are passed through slots 21 in the said pulley boss 16 into the clutch 15 as shown clearly in Figs. 2 and 4.

Figure 4:
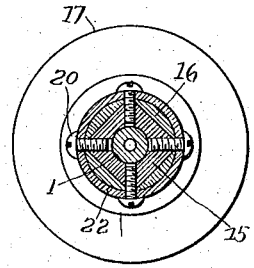
Fig. 4 is a cross sectional view through the pulley boss and shows the arrangement of the sliding clutch therein.
Figure 1:
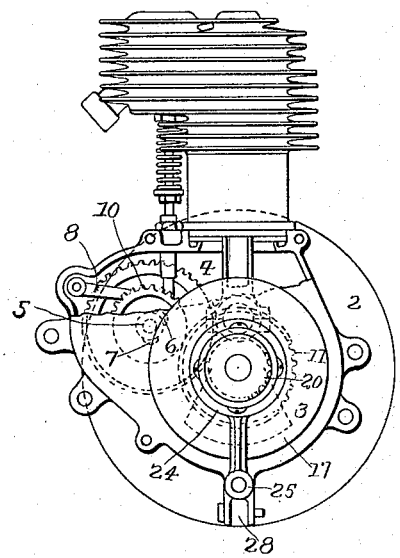

Over the said pulley boss 16 a sleeve 22 is fitted said sleeve being adapted to move longitudinally thereon. The screws 20 engage with the said sleeve 22 as shown in Figs. 2 and 4, and if the said sleeve be slid along the pulley boss 16 the motion will be transmitted by means of the said screws to the sliding clutch 15 which thus may be engaged with the shaft or sleeve clutches as hereinbefore described. A groove 23 is cut around the outside of the sleeve 22 into which fits the sliding fork Fig. 2.

The said fork 24 is carried upon a pin 25 secured to the crank case. One of the crank case bolts may be extended and used for this purpose as shown in Fig. 2.

A small plunger 26 is placed in a hole drilled in the fork as in Fig. 2 and is forced outward by spring 27 so as to engage with notches cut in the pin 25, corresponding to the three positions of the sliding clutch 15. The strength of the spring 27 must be sufficient to prevent the fork 24 being accidentally displaced, but not so great as to prevent the said fork being operated by the rod 28 which is connected to a hand operated lever or a foot pedal as may be desired. Said fork 24, pin 25 and spring 27, and plunger 26 are seen on a larger scale in Figs. 7 and 8.

I shall now refer to modifications and alternative arrangements of positive and frictional clutches which however all incorporate the essential features of my said invention.

Figure 5:
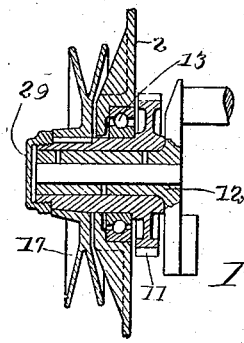
Fig. 5 is a detached longitudinal section showing the crankshaft and sleeve with belt pulley fixed securely to the latter.

First I shall describe the arrangement illustrated in Fig. 5, which shows the belt pulley 17 keyed directly to the sleeve 12 and held securely by the cap 29. I shall as far as possible, use the same reference numbers throughout for corresponding parts. The pulley in this case is always driven through the cam shaft and gears and consequently runs considerably slower than the crankshaft 1.

This structure is useful in the case of a small high speed engine. In small high speed engines it is necessary to use a very small pulley to get sufficient reduction of speed at the road wheel. The structure illustrated in Fig. 5 enables a much larger pulley to be used on account of the lower speed thereof, with increased gripping power and life of the driving belt.

The said structure shown by Fig. 5 however, only gives a single speed and no provision is made to allow the engine to run free.

Figure 6:
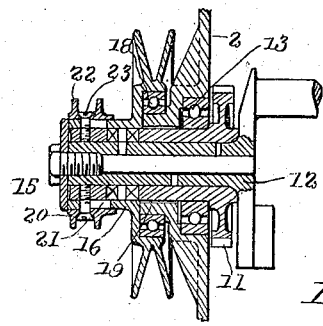
Fig. 6 is a detached longitudinal section showing the sleeve provided with a clutch, and means to engage and disconnect the driving pulley therewith.

In Fig. 6 provision is made for declutching the engine in addition to the single speed reduction. Here the parts are arranged similarly to those hereinbefore described and illustrated in Figs. 2 and 3. In the structure shown by Fig. 6 there is no shaft clutch, the drive always being through the sleeve 12 consequently the sliding clutch 15 has clutch jaws only at its inner end, and said sliding clutch is operated by a sliding fork through the medium of the groove 23 of sleeve 22, and screws 20 as hereinbefore described.

Pulley 17 and boss 16 are kept in place by a retaining nut and washer at the end of the crank shaft as shown in Figs. 2, 3, 6, and 7.

Figure 7:
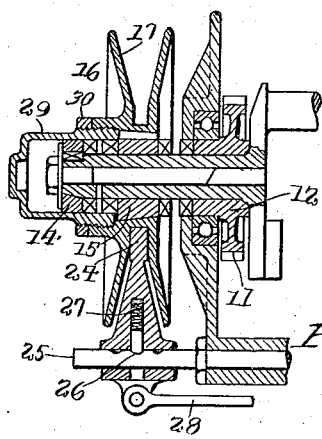
Fig. 7 is a longitudinal section showing an alternative method of clutching and declutching the driving pulley to that illustrated in Figs. 2 and 3.
Figure 8:
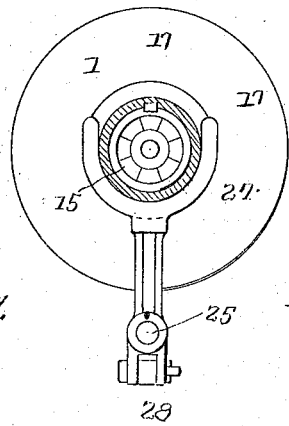
Fig. 8 is a part cross sectional view through the pulley in Fig. 7.

I shall now refer to Fig. 7 which shows an alternative method to that first described for providing two speeds and free engine. In this case the pulley 17 is securely keyed directly to the sliding clutch and moves longitudinally with it, the position of the shaft and sleeve clutches being precisely as hereinbefore described.

The cap 29 runs upon the outside of the shaft clutch 14 and is screwed into the pulley boss 16 thus drawing the pulley firmly down upon the conical surface of the sliding clutch 15 as illustrated in Fig. 7. A locknut 30 is screwed upon the said cap 26 and against the end of the pulley boss 17 thus locking the cap and preventing the pulley working loose on the sliding clutch. In this case as hereinbefore described, the pulley is slid bodily along the crankshaft into either of the two speeds or the free engine position. A groove is turned in the bottom of the pulley into which is fitted the operating fork 24, which is carried upon the pin 25 and operated and retained in position precisely as described hereinbefore.

The fork 24 must be arranged so as not to foul the belt, it may preferably be placed in a horizontal position with the belt passing above and below it.

This form of the device has the advantage of simplicity and cheapness but is open to the objection that the pulley in one or other position must be slightly out of line with the rear pulley. For small powers this objection is not serious especially if a pulley with deep flanges be used to guide the belt.

I shall now describe and illustrate the means I adopt to provide frictional clutches to convey the power from the crankshaft or sleeve to the driving pulley.

Figure 9:
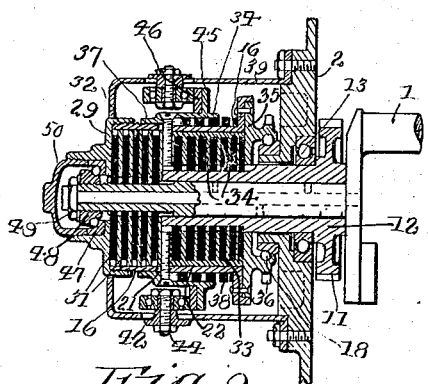
Fig. 9 is a longitudinal section showing the sleeve and crankshaft provided with multiple disk clutches.
Figure 10:
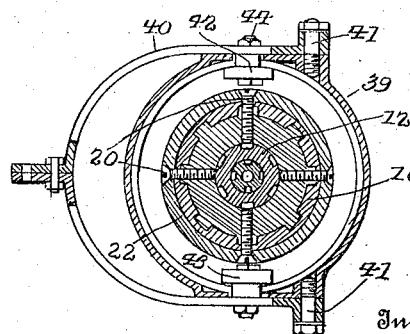
Fig. 10 is a part transverse section through the operating disk in Fig. 9, and shows the pivoted fork lever for disengaging the shaft clutch and engaging the sleeve clutch.

For this purpose I shall refer to Figs. 9 and 10 which show the mechanism combined with a sprocket wheel and for chain drive.

I preferably use frictional clutches of the well known multiple disk type owing to the ease with which they may be applied to the present invention.

The crankshaft 1 and sleeve 12 are arranged as hereinbefore described but each has a series of flutes or keyways cut longitudinally thereon. A series of clutch plates 31, shown black in Fig. 9 engage with the said flutes cut on the crankshaft and lie alternately between the series of clutch plates 32 which engage with longitudinal slots cut upon the inside of the drum 16 which now takes the place of the pulley boss aforesaid. A series of clutch plates 33 also shown black in Fig. 9 engage the flutes on the sleeve 12 and are disposed alternately between plates 34 also engaging the drum 16.

The said two series of clutch plates 31, 32 and 33, 34, constitute two independent multiple disk clutches corresponding to the shaft and sleeve clutches aforesaid. The said drum 16 is closed at its outer end by the clutch 29 and at its inner by the disk 35 to which is attached the chain sprocket wheel 36, or pulley if belt drive be adopted.

Operating disks 31, 32, 33 and 37 similar to the said disk 34, but thicker and like them engaging with the longitudinal slots of the drum 16 are interposed between the above described multiple disk clutches. Pressure may be applied by the said disk 37 to either of the said clutch groups in an endwise direction. If the said disk is operated to apply pressure in a direction outwardly from the crankcase 2, so as to press the series of plates 31, 32 against each other and the cap 29, the frictional contact of the said plates 31 and 32 will cause the crankshaft to drive the drum and the chain sprocket wheel directly.

Again if the said disk 37 is operated to apply pressure toward the crankcase 2 then through the frictional contact of plates 33, 34, the drive will take place through the medium of the sleeve 12, and the engine will be in the low gear. When the disk 37 is in an intermediate position pressure is removed from the said clutch plate groups and the engine runs free. A small amount of end play must be provided for the operating disk 37, as will be obvious to those skilled in the art.

I shall now describe the means adopted for applying end pressure to the said disk 37. Screws 20 are passed through slots 21 cut in the drum 16, and said screws also engage with the sleeve 22 as hereinbefore described in the case of positive clutch drive. A strong spiral spring 38 encircling the drum 16 and within the sleeve 22 keeps the latter under pressure in a direction outwardly from the crank case, and this pressure is transferred by means of the screws 20 to the disk 37 and thence to the shaft clutch which is thus normally kept in operation.

To release the shaft clutch and engage the sleeve clutch pressure is applied in the direction to compress the said spring 38.

I shall now describe how this pressure is applied so as to free the engine and engage the low gear. Housing 39 having a suitable opening for the belt or chain to pass through is bolted to the crankcase 2 and carries a forked lever 40, pivoted upon studs 41 screwed into the housing 39 as shown in Fig. 10. Through slots in the said housing bosses 42, rigidly attached to the said lever 40 project and carry ball bearing rollers 43 secured in position by bolts 44. The sleeve 22 has a collar 45 formed integrally with it against which rests a ring 46 preferably made of hardened steel. By means of the said lever 40 rollers 43 are brought in contact with and press upon the ring 46 thus forcing sleeve 22 inwardly toward the crank case 2, thus first freeing the engine and on applying further pressure, engaging the sleeve clutch and putting the engine in the low gear. The cap 29 contains a ball bearing 47, which runs upon a cone 48 screwed on the outer end of the crankshaft 1 and locked thereon by the nut 49. Said cone 48 is adjustable to take up wear thereon and also through the clutches through the medium of the ball bearing 47 and cap 29. The inner end of the drum 16 is mounted on the ball bearing 18 and boss 19 arranged as hereinbefore described and for the purpose specified.

The crankshaft is preferably made hollow and provided with radial holes through which oil may pass from the interior of the crankcase and lubricate the clutches and other parts as shown in the various drawings.

Having now fully described and ascertained my said invention and the manner in which it is to be performed I declare that what I claim is:—

1. In an internal combustion engine of the inclosed crank type, in combination, a crankshaft, a camshaft carrying valve operating cams arranged parallel to said crankshaft, and driven at one-half the speed thereof by suitably inclosed gearing arranged at one end of the said shafts; suitably inclosed gearing arranged at the other end of the said shafts adapted to drive a sleeve concentrically mounted upon the crankshaft, said sleeve projecting through and being supported by the main bearing and being associated with the crankshaft and adapted to revolve in the same direction as the said crankshaft but at a lower speed depending on the ratio of the said gearing, and transmission means adapted to be connected either to a portion of the crank shaft or to the sleeve.

2. In an internal combustion engine of the inclosed crank type, in combination, a crank shaft, a cam shaft having valve operating means and arranged parallel to the crank shaft, intermeshing gear devices carried by the crank shaft and cam shaft for driving the cam shaft at one-half the speed of the crank shaft, a transmission element having a sleeve rotatable about the crank shaft and connected to the cam shaft, and a second transmission element adapted to be connected either to the shaft extension or the sleeve.

3. In an internal combustion engine of the inclosed crank type, in combination, a crank shaft having an extension, a sleeve loosely mounted on the extension of the crank shaft, the crank shaft and sleeve being provided with clutch means, a transmission element carrying clutch means to cooperate with the clutch means of the crank shaft and sleeve, valve operating means having gear devices, and gear devices on the crank shaft and sleeve having a meshing association with those of the cam operating means.

4. In an internal combustion engine of the inclosed crank type, the combination of a crank shaft, a cam shaft having valve operating means associated therewith, a sleeve loosely mounted on a portion of the crank shaft and connected to the cam shaft, intermeshing gear devices respectively carried by the crank shaft, sleeve and cam shaft, and clutch means connectible either to the sleeve or to a portion of the crank shaft.

5. In an internal combustion engine of the class specified, a crank shaft having an extension with a sleeve rotatably mounted thereon, the crank shaft carrying a gear device, valve operating means carrying gearing in part operated by the gear device of the crank shaft, the sleeve also having a gear device in operative relation to the remaining part of the gears of the valve operating means, and adjustably mounted transmission means connectible either to the sleeve or the crank shaft whereby different speeds or a neutral condition may be obtained.

6. In an internal combustion engine of the class specified, the combination of a crank shaft having an extension, a sleeve loosely and rotatably mounted on the said extension, the crank shaft and sleeve carrying gear devices, valve operating means including a cam shaft provided with gear devices operatively associated with the gear devices of the crank shaft and sleeve, the sleeve being provided with a clutch terminal, a sliding clutch mounted on the crank shaft extension, a fixed clutch member on the end of the shaft extension, the sliding clutch being between the sleeve and the fixed clutch member and having a transmission element in non-rotatable association therewith, and means for operating the sliding clutch to obtain different speeds or to provide for a neutral position of the sliding clutch to allow the engine to run free.

7. In an internal combustion engine, the combination of a crank shaft having an axial extension, a sleeve concentrically rotatable on the said extension, gearing inclosed within the engine crank case engaging with the said shaft and sleeve for rotation of the latter at a speed differing from the former, and a power transmission element mounted on said shaft extension and adapted to be connected to the sleeve or shaft extension.

8. In an internal combustion engine, the combination of a crank shaft having an axial extension, a sleeve concentrically rotatable on the said extension and having a transmission element, a cam shaft with gear means connected to the said transmission element, and a second transmission element adapted to be connected either to the crank shaft extension or the sleeve.

In testimony whereof I have hereunto set my hand.

ARTHUR GEORGE LLOYD NEIGHBOUR.

Copies of this patent may be obtained for five cents each, by addressing the "Commissioner of Patents, Washington, D. C."